United States Patent [19]

Shaw

[11] Patent Number: 4,556,495
[45] Date of Patent: Dec. 3, 1985

[54] IMMISCIBLE DISPLACEMENT OF OIL WITH SURFACTANT SYSTEM

[75] Inventor: James E. Shaw, Bartlesville, Okla.

[73] Assignee: Phillips Petroleum Company, Bartlesville, Okla.

[21] Appl. No.: 508,637

[22] Filed: Jun. 28, 1983

[51] Int. Cl.$^4$ .............................................. E21B 43/16
[52] U.S. Cl. ................................ 252/8.55 D; 166/275
[58] Field of Search .................. 252/8.55 D; 166/274, 166/275

[56] References Cited

U.S. PATENT DOCUMENTS

| | | | |
|---|---|---|---|
| Re. 23,360 | 4/1951 | Berl | 166/21 |
| 3,170,514 | 2/1965 | Harvey et al. | 166/275 |
| 3,174,542 | 5/1965 | Reisberg | 166/9 |
| 3,185,214 | 5/1965 | Bernard et al. | 166/9 |
| 3,298,436 | 1/1967 | McCardell | 166/9 |
| 3,330,344 | 7/1967 | Reisberg | 166/275 |
| 3,330,347 | 7/1967 | Brown et al. | 166/9 |
| 3,366,174 | 1/1969 | Ferrell et al. | 166/273 |
| 3,368,621 | 2/1968 | Reisberg | 166/9 |
| 3,373,809 | 3/1968 | Cooke | 166/9 |
| 3,410,343 | 11/1968 | Abdo | 166/274 |
| 3,452,817 | 7/1969 | Fallgatter | 166/305 |
| 3,874,454 | 4/1975 | Clark et al. | 166/270 |
| 3,912,010 | 10/1975 | Clark et al. | 166/270 |
| 3,938,591 | 2/1976 | Ossip et al. | 166/275 |
| 3,981,361 | 9/1976 | Healy | 166/252 |
| 4,037,656 | 7/1977 | Cooper | 166/270 |
| 4,079,785 | 3/1978 | Hessert et al. | 166/273 |
| 4,125,156 | 11/1978 | Glinsmann | 166/252 |
| 4,404,109 | 9/1983 | Tellier et al. | 252/8.55 D |

*Primary Examiner*—Prince E. Willis
*Assistant Examiner*—Willie J. Thompson
*Attorney, Agent, or Firm*—C. F. Steininger

[57] ABSTRACT

In accordance with the present invention it has been found that improved recovery of oil from a subsurface earth formation can be attained by injecting into the formation a surfactant system comprising a carboxylate surfactant, a cosurfactant and an electrolyte in concentrations and proportions to form an immiscible three-phase system with the reservoir oil comprising a predominantly oil phase, a microemulsion phase and an aqueous phase. The carboxylate surfactant is preferably selected from the group consisting of branched aliphatic carboxylates and mononuclear aromatic carboxylates. Where aliphatic carboxylates are utilized as a surfactant, it is preferred that the polar organic material utilized as a cosurfactant have a solubility in water less than about ten grams per hundred grams of water at about 20° C. and, when an aromatic carboxylate is utilized as a surfactant, it is preferred that the polar organic material utilized as a cosurfactant have a water solubility greater than about ten grams per hundred grams of water at about 20° C. In accordance with another aspect of the present invention, it has been found that surfactant systems containing carboxylate surfactants will recover optimum amounts of oil when a base is added to the surfactant system to adjust the pH to a value at which the surfactant system results in optimum oil recovery.

21 Claims, No Drawings

IMMISCIBLE DISPLACEMENT OF OIL WITH SURFACTANT SYSTEM

The present invention relates to a method of recovering oil from a subsurface earth formation by displacement of the oil with an aqueous surfactant system.

BACKGROUND OF THE INVENTION

Oil exists in subterranean formations or reservoirs in a wide variety of forms, in a wide variety of formations and under a wide variety of natural conditions. In most cases natural forces present in the reservoir permit the production of significant amounts of the oil by so-called primary recovery methods. Usually this is brought about by the fact that reservoir pressure, supplied by gas under pressure, either in solution in the oil or as a gas cap, water, etc. is sufficient to force the oil to the surface of the earth. In any event, these so-called primary recovery methods are capable of recovering only minor portions of the original oil in place due to depletion of the natural forces and other factors. In some cases little or none of the oil can be produced by natural forces. Accordingly, a wide variety of supplemental or artifical recovery techniques have been employed and still more have been proposed in order to increase the recovery of oil from subterranean formations. If the artifical recovery technique is utilized in reservoirs having insufficient natural production forces it is often referred to as primary recovery and, if used immediately following discontinuance of primary recovery methods, such technique has been referred to as a secondary recovery technique. If a so-called secondary recovery technique is followed by another artifical recovery technique, the latter has often been referred to as tertiary recovery. However, the lines of demarcation among these three techniques have been obliterated to a certain extent and it is, therefore, best to refer to all such artifical recovery techniques, whether primary, secondary or tertiary, as "enhanced oil recovery" techniques. Irrespective of the name applied to the recovery technique, all such enhanced oil recovery techniques include the injection of a gaseous or a liquid fluid into one or more injection wells under a pressure sufficient to displace or drive at least a portion of the oil from the reservoir, i.e. above the reservoir pressure, and producing the thus displaced oil from one or more producing wells. Obviously, a wide variety of driving fluids or injection fluids and combinations thereof have been proposed. However, the basic drive fluids or injection fluids include air, natural gas, carbon dioxide, propane, steam, water, surfactants and polymers. Unfortunately, none of these materials is an ideal displacement fluid due to a number of factors which affect the amount of oil which can be recovered by enhanced oil recovery techniques.

It has long been recognized that the major factors which influence the amount of oil recovered by enhanced oil recovery techniques include the relative mobility of the reservoir oil and injected fluid, the wettability characteristics of the rock surfaces within the reservoir and the interfacial tension between the injected fluid and the reservoir oil.

Obviously, if plug-type flow of oil and displacing fluid from injection wells to production wells could be accomplished substantial amounts of the oil in place could be displaced. However, this is generally not accomplished because of the fact that most displacing fluids will travel faster through the reservoir than the oil because of adverse mobility ratios. While a rather simplistic explanation, the relatively low viscosity of gases, as opposed to the oil, causes the gas to follow paths of least resistance, with the result that the gas will channel through fractures and fissures, selectively pass through zones of higher permeability and in general contact a small area of the reservoir in passing from the injection well to the production well. In addition, gravity segregation of the injected gas and the oil causes the gas to rise to the top of the reservoir where it tends to ride over the top of the oil bank. Accordingly, while gases such as natural gas and air are usually readily available and relatively inexpensive, they are also relatively inefficient as displacing media under ordinary conditions. In addition, one must also consider the cost of compressing the gas to a pressure sufficient for displacement of the oil. On the other hand, liquids have a more favorable mobility ratio with respect to reservoir oil due primarily to their greater viscosity. Consequently, conventional water injection or waterflooding has been the most widely practiced enhanced oil recovery technique. However, the mobility ratio between water and reservoir oil is still generally poor. Accordingly, numerous modifications of conventional waterflooding have been proposed to overcome this problem. These include thickening the water with various materials, such as polymers, forming viscous water-oil emulsions by the use of surfactants, etc. Obviously, these thickening or emulsifying materials are expensive and cannot be used throughout the entire waterflood. Hence the thickening agent or emulsion is utilized only in that portion of the water in contact with the oil. An alternative is the injection of a small slug of polymer, generally having a viscosity greater than the viscosity of the oil, at the contact between the polymer and the oil, and a terminal viscosity, at the contact with the water, which is near that of the viscosity of water. Such graded concentration is usually logarithmic, from the viscosity of the reservoir oil to the viscosity of the water. In other variations, a thickening or viscosifying agent is preceded by one or more other displacing media and followed by water.

The wettability characteristics of the rock surfaces also affect displacement of oil by water. If the rock surfaces are oil wet, substantial amounts of the oil will adhere to the rock surfaces and resist displacement by the water. If the oil wettability of the rock surfaces can be altered either by decreasing the oil wettability or even reversing the wettability, to render the rock surface water wet, substantial improvement in oil displacement by water can be attained. Such reduction of oil wettability or reversal of wettability can also be accomplished by the utilization of surfactants. However, as previously discussed, such surfactants are expensive and therefore must be utilized in limited quantities, generally as a slug ahead of the water drive.

The interfacial tension between a displacing fluid and reservoir oil is primarily dependent upon the ability of the two materials to mix. As a result miscible replacement techniques have been developed. For example, if natural gas is compressed to a sufficiently high pressure, usually above about 3000 psi, the gas can be rendered miscible with the reservoir oil. However, in some cases, if the miscibility pressure is too high to be practical or the reservoir cannot withstand pressures of this magnitude, this process cannot be used. In addition, the additional compression cost also adds to the cost of the project. Where applicable, however, this technique has proven quite effective. Similarly, at lower pressures, carbon dioxide can be rendered miscible with reservoir oils and miscible displacement can be carried out by displacing the oil with carbon dioxide. In addition to the advantage of the lower miscibility pressure, carbon dioxide has the advantage of a relatively high solubility in water. Consequently, techniques have been proposed in which a slug of carbon dioxide is followed by water or the carbon dioxide is dissolved in the water. At still lower pressures ethane and propane and mixtures thereof can be made miscible with reservoir oil. However, these materials, particularly propane, are expensive relative to the value of the oil displaced and accordingly can not be utilized in unlimited amounts. As a result the "propane slug process" has been developed in which a slug of propane is driven through the reservoir by gas, usually natural gas, under conditions such that the propane is miscible with the oil being displaced and with the driving gas. Again, while this technique is effective in appropriate reservoirs, utilization of gases as the drive fluid interjects the above-mentioned problems of mobility. Finally, under certain conditions, surfactants can be utilized in the miscible displacement of oil. At this point it should be recognized that the terms "miscible" and "miscibility", as they relate to enhanced oil recovery techniques, have been somewhat misused, for example by the use of terms such as "partial miscibility". However, what is generally meant by such terms is that one fluid is partially soluble in the other. Consequently, a more accurate definition of "miscible" or "miscibility", and the definition which will be utilized herein, is that the two fluids in question are mixable with each other in all proportions and of "solubility", that there is a limit to the amount of a material which is soluble in or will mix with a fluid. While miscibility between the reservoir oil and the displacing fluid can be said to be ideal, to the extent that the oil-water interfacial tension is minimal, it is not necessary to obtain miscibility in order to reduce the oil-water interfacial tension and substantially improve displacement of oil by the drive fluid. Significant lowering of oil-water interfacial tension can be accomplished by the utilization of surfactants and highly effective immiscible displacement can be attained.

It is obvious from the above that the utilization of surfactants in enhanced oil recovery techniques has numerous advantages over the other techniques discussed. As previously indicated, the surfactant reduces the interfacial tension between a surfactant solution and reservoir oil and alters the oil wettability of the rock surfaces, thus substantially improving displacement of the oil. Secondly, since the surfactant solution is a liquid, it can be driven by water and the disadvantages of unfavorable mobility ratios, which are present when gases are used as drive fluid, are significantly reduced. Finally, enhanced oil recovery techniques utilizing surfactants can be utilized in reservoirs which have already been subjected to other recovery techniques, particularly where the reservoir has been produced to its economic limits by waterflooding. As a result, a substantial amount of research has been carried out in developing a wide variety of techniques utilizing surfactants and in improving the basic forms of these techniques. As previously indicated, because of the relative cost of surfactants, the surfactants are generally utilized in small amounts or in slug type operations in which the surfactant solution is driven through the reservoir by water.

The most basic of the surfactant techniques involves the injection of an aqueous surfactant solution, simply to reduce the oil-water interfacial tension. Such techniques are often referred to as "low tension waterflooding" techniques. Today one of the most promising low tension waterflooding techniques involves the injection of aqueous solutions of petroleum sulfonates, having a predetermined equivalent weight range, under controlled conditions of salinity. This basic technique is further improved by sequential injection of a protective slug, the surfactant slug, a mobility control slug and finally water. The protective slug is an aqueous solution of sodium chloride which is injected in order to displace reservoir water ahead of the subsequently injected surfactant slug. The protective slug is substantially free of divalent ions which would tend to precipitate the subsequently injected surfactant. The surfactant slug comprises an aqueous solution of petroleum sulfonates and contains sodium chloride in a concentration, typically between about 1.0 to 7.0 weight percent, which will promote the desired low interfacial tension between the injected water and the reservoir oil. The subsequently injected mobility control slug is a thickened water slug containing a viscosifier or thickening agent, such as a water soluble biopolymer or polyacrylamide. The mobility control slug is preferably of logarithmically graded concentration in order to provide an initial viscosity greater than the viscosity of the reservoir oil and a terminal viscosity near that of water. Finally, the driving fluid may be water from any source, but is usually brine present in the reservoir with the oil. In addition to petroleum sulfonates, a wide variety of synthetic sulfonates and complex sulfonates derived from either petroleum or synthetic sources have been proposed to further improve the process and overcome other problems which exist in certain reservoir environments.

As previously indicated, surfactants may be utilized under conditions to produce miscible or immiscible displacement of the oil. In addition, such surfactants have been used in systems which do not form microemulsions and those which do form microemulsions. In recent years considerable research has been devoted to the latter systems.

The microemulsions which have been proposed for miscible displacement have been selected from compositions in the single phase region of a ternary diagram. Such microemulsion systems can be either oil-external microemulsions or water-external microemulsions. When such microemulsion systems are used, it is believed that the initial stages of oil recovery involve an efficient miscible displacement with subsequent immiscible displacement, upon the breaking down of the microemulsion into multiple phases due to dilution of the microemulsion with crude oil and reservoir water at its leading edge and dilution with the aqueous drive fluid at its trailing edge. Hence, optimization of such microemulsion surfactant systems is approached in terms of minimization of the multiphase region in the phase diagram so as to prolong miscible displacement with low interfacial tensions in the multiphase regions to thereby enhance immiscible displacement. From a practical standpoint, however, the development of effective microemulsion systems which can economically recover oil from a subterranean formation suffers from certain drawbacks in that it is difficult to maintain miscible displacement and it is difficult to obtain the low interfacial tensions necessary to provide effective immiscible displacement after miscible displacement ceases.

Surfactant systems have been developed which form microemulsions on contact with the reservoir oil. For example, U.S. Pat. No. 3,373,809 discloses recovering oil through the formation of a microemulsion formed in situ by injecting a surfactant system. This patent is based on the formation of a single phase microemulsion system with the reservoir oil by injecting a surfactant system to form the microemulsion system in situ. However, in order to achieve the desired results, extremely high concentrations of surfactant must be utilized. Such quantities of surfactant are usually in excess of about 7% to 15% by weight so as to provide a composition within the single phase region of a ternary diagram and, as such, can easily exceed the value of the oil recovered. Accordingly, it is becoming well recognized that it is impractical from an economic standpoint to maintain such a highly concentrated surfactant composition in the reservoir, which will remain effectively miscible throughout the lifetime of the operation, as proposed by the above patent and others.

Recent work has led to the suggestion of injecting microemulsion systems wherein the microemulsion phase is immiscible with the resident fluids in the reservoir. For example, U.S. Pat. No. 3,885,628 proposes to form a multiphase microemulsion system above ground by mixing oil, brine and surfactant and injecting at least the immiscible microemulsion phase. In some cases this patent suggests injecting one or more of the other phases, which exist in equilibrium with the microemulsion phase along with the immiscible microemulsion phase. Later work, as set forth in U.S. Pat. No. 3,981,361, describes procedures for producing surfactant systems above ground which are injected as an immiscible microemulsion. In this case emphasis is placed on the injection of the single immiscible surfactant-rich microemulsion phase. Also, U.S. Pat. No. 3,938,591 discusses the injection of immiscible microemulsion systems which resist uptake of oil and water into the immiscible microemulsion phase. In the last three techniques described, there is the obvious disadvantage of requiring the injection of a composition containing substantial amounts of oil which, of course, adds to the cost of the injected composition. In addition, there is the problem of achieving the optimum system for a given oil, since it turns out that different oils behave differently.

In order to overcome the above-mentioned and other difficulties encountered in the prior art use of surfactants in oil recovery, U.S. Pat. Nos. 4,079,785 and 4,125,156, which are incorporated herein by reference, disclose that an effective immiscible surfactant drive can be carried out by injecting a slug of surfactant solution comprising a surfactant, an electrolyte, preferably a monovalent metal electrolyte, usually sodium chloride, water and, optionally, a cosurfactant to form a multiphase system in situ in the reservoir which comprises; at least two different regions, for example, an oil-rich region and a microemulsion region. The latter patent points out that best results are obtained when three different multiphase regions are formed, namely, a microemulsion, in equilibrium with an oil phase, a microemulsion in equilibrium with both an oil phase and a water phase and a microemulsion in equilibrium with a water phase. It is pointed out in this patent that among the variables which affect the three-phase region in which a particular system will partition are salinity, oil type, surfactant average equivalent weight, cosurfactant type and temperature. The patent also goes on to point out that, if all variables are fixed except the salinity, the system will shift from a microemulsion in equilibrium with an oil phase to a microemulsion in equilibrium with both an oil phase and a water phase to a microemulsion system in equilibrium with a water phase, as the salinity increases from zero. Finally, the patent sets forth a simple procedure which can be carried out in a laboratory to establish the system of water, electrolyte, surfactant and, optionally, cosurfactant and the proportions thereof which will be most effective for enhancing oil recovery when injected into the reservoir of interest. This laboratory procedure involves equilibration of water from the reservoir of interest or synthesized reservoir water, the surfactant, and optionally the cosurfactant, and oil from the reservoir of interest, a synthesized oil from the reservoir of interest or pure hydrocarbons or mixtures thereof having an equivalent alkane carbon number matching that of the reservoir oil at differing electrolyte concentrations. The optimum system which would be most effective for enhancing oil recovery is that system which will form the second phase, i.e., a microemulsion in equilibrium with both an oil phase and a water phase over a narrow range of salinity. This optimum salinity can, of course, occur at different electrolyte concentrations, depending upon the characteristics of the water and the oil.

Any of the surfactant systems previously discussed, whether those which form a microemulsion or those which do not or those which are miscible or those which are immiscible with the resident fluids, can contain varying amounts of monovalent metal electrolytes, either as components of the formation water, as added electrolytes or both. In some cases the salinity of the surfactant system, which is injected into the reservoir may range up to 4.0%. In addition, the so-called "high brine" reservoirs contain formation waters with substantial amounts of monovalent metal salts and/or polyvalent metal salts or ions, such as calcium and magnesium ions, in concentrations as high as 20,000 parts per million in the case of the polyvalent metal ions. Such high brine environments limit the usefulness of most surfactants, since such surfactants lack stability in such environments. Specifically, the surfactants tend to precipitate in the presence of monovalent salts such as sodium chloride at concentrations in excess of about 2 to 3 weight percent and in the presence of polyvalent metal ions, such as calcium and magnesium ions, at concentrations of about 50 to 100 parts per million and above. Such precipitation of the surfactants not only reduces the amount of surfactant available for lowering interfacial tension and altering rock wettability but the precipitates, in some cases, will eventually plug the formation. While a wide variety of anionic and nonionic surfactants have been proposed as surfactants in oil recovery techniques and the latter are generally more tolerant to high brine environments than the former, surfactants used predominately to date have been petroleum sulfonates and synthetic alkyl or alkylaryl sulfonates. While these surfactants are comparatively inexpensive, are readily available and are extremely effective in reducing interfacial tension to desired low values within the millidyne per centimeter range, they are also the least stable in high brine environments. In any event, most such surfactants can be satisfactorily utilized only if the calcium and magnesium concentration of the formation water is below about 500 parts per million.

In view of the limitations imposed on the use of certain surfactant types in high brine environments, various amphoteric surfactants which are stable in high brine environments have been proposed. For example, a mixture of sulfonated betaine, an alkyl or alkylaryl sulfonate and a phosphate ester sulfonate; amphoteric quaternary ammonium carboxylates; certain hydrocarbyl quaternary ammonium sulfonates or carboxylates; a mixture of alkyl or alkylaryl sulfonates; an alkylpolyethoxylated sulfate; sodium dodecylpolyethoxy sulfate and a fatty acid diethanolamide; mixtures of a quaternary ammonium sulfonate with a $C_5$–$C_8$ aliphatic alcohol, etc. Obviously, most of these proposed surfactants or mixtures increase the cost of the operation and, in the case of mixtures, the proportions of the components are highly critical. It has also been suggested that the detrimental effect of polyvalent metal ions can be avoided by the addition of a sacrificial agent to the floodwater or by preflooding the reservoir to displace the divalent salt-containing brines and thereby eliminate the problem. Here again, the addition of other materials to the recovery system will increase the cost of the operation and manipulative techniques, such as preflooding, unduly extend the time necessary to obtain recovery and the cost.

As indicated above, while a wide variety of anionic and nonionic surfactants have been proposed for use in surfactant systems for oil displacement, the vast majority of surfactants used to date have been sulfonate type surfactants. By contrast, carboxylate-type surfactants appear in the prior art in situations where the author or patentee lists all known types of surfactants or for a highly specific purpose, such as the complex carboxylates mentioned above for use in high salinity and/or high brine environments in combination with other surfactants or among surfactants mentioned for miscible displacement processes. Beyond these specific uses and casual references to carboxylates surfactants as components for surfactant systems for oil displacement, it has also been suggested that such surfactants can be prepared by extracting carboxylic acids from crude oil or certain oil fractions or by-products and using the salts thereof for oil displacement or the generation of carboxylates in situ in a subsurface earth formation by the injection of an alkaline material to convert the naturally occurring acids to the carboxylates.

SUMMARY OF THE INVENTION

An object of the present invention is to provide an improved method for the recovery of oil from a subsurface earth formation which overcomes the above-identified and other problems of the prior art. Another and further object of the present invention is to provide an improved method for the recovery of oil from a subsurface earth formation which utilizes a novel aqueous surfactant system. Still another object of the present invention is to provide an improved method for the recovery of oil from a subsurface earth formation utilizing an aqueous surfactant system adapted to immiscibly displace oil. A still further object of the present invention is to provide an improved method for the recovery of oil from a subsurface earth formation utilizing an aqueous surfactant system in conjunction with an aqueous drive fluid. Another and further obect of the present invention is to provide an improved method for the recovery of oil from a subsurface earth formation, which previously has been subjected to waterflooding, wherein an aqueous surfactant system is utilized. Another object of the present invention is to provide an improved method for the recovery of oil from a subsurface earth formation utilizing carboxylate-type surfactants. Another and further object of the present invention is to provide an improved method for the recovery of oil from a subsurface earth formation utilizing carboxylate-type surfactants selected from the group consisting of aliphatic carboxylates and aromatic carboxylates. Yet another object of the present invention is to provide an improved method for the recovery of oil from a subsurface earth formation utilizing carboxylates with branched alkyl substituents. Yet another object of the present invention is to provide an improved method for the recovery of oil from subsurface earth formations utilizing mononuclear alkylated aromatic carboxylates. Another and further object of the present invention is to provide an improved method for the recovery of oil from a subsurface earth formation utilizing carboxylate surfactants in combination with selected polar organic materials as cosurfactants. Yet another object of the present invention is to provide an improved method for the recovery of oil from a subsurface earth formation utilizing a surfactant system, including a carboxylate surfactant, a cosurfactant, an electrolyte and a base. A still further object of the present invention is to provide an improved method for the recovery of oil from the subsurface earth formation utilizing a surfactant system including a carboxylate surfactant, a polar organic material as a cosurfactant, an electrolyte and a base selected to produce a system which obtains optimum oil recovery. These and other objects and advantages of the present invention will be apparent from the following description.

In accordance with the present invention it has been found that improved recovery of oil from a subsurface earth formation can be attained by injecting into the formation a surfactant system comprising a carboxylate surfactant, a cosurfactant and an electrolyte in concentrations and proportions to form an immiscible three-phase system with the reservoir oil comprising a predominantly oil phase, a microemulsion phase and an aqueous phase. The carboxylate surfactant is preferably selected from the group consisting of branched aliphatic carboxylates and mononuclear aromatic carboxylates with alkyl substituents. Where aliphatic carboxylates are utilized as a surfactant, it is preferred that the polar organic material utilized have a cosurfactant have a solubility in water less than about ten grams per hundred grams of water at about 20° C. and, when an aromatic carboxylate is utilized as a surfactant, it is preferred that the polar organic material utilized as a cosurfactant have a water solubility greater than about ten grams per hundred grams of water at about 20° C. In accordance with another aspect of the present invention, it has been found that surfactant systems containing carboxylate surfactants will recover optimum amounts of oil when a base is added to the surfactant system to adjust the pH to a value at which the surfactant system results in optimum oil recovery.

DETAILED DESCRIPTION OF THE PREFERRED EMBODIMENTS

Before proceeding with a detailed description of the embodiments of the present invention, it will be helpful to define certain expressions which will be utilized herein and in the claims.

The phrase "optimum salinity" or "optimal salinity" refers to a salinity within that range of amounts of electrolyte which is the narrowest range of amounts of electrolyte over which a three-phase system, comprising: a predominantly oil phase, a microemulsion phase and a predominantly aqueous phase, forms when varying amounts of electrolyte are equilibrated with a selected surfactant in a selected amount, optionally, a selected cosurfactant in a selected amount and the reservoir oil in question, a simulated reservoir oil or a pure hydrocarbon or mixture of hydrocarbons having an effective alkane carbon number essentially the same as the equivalent alkane carbon number of the reservoir oil in question in a selected amount.

The "equivalent alkane carbon number" is that value assigned to a reservoir oil which most closely approximates the effective number of carbon atoms or effective alkane carbon number of one or a mixture of pure hydrocarbons which forms essentially the same three-phase system when equilibrated with a selected surfactant in a selected amount, optionally, a selected cosurfactant in a selected amount, water and electrolyte in a selected amount.

Where materials and/or amounts thereof are referred to herein as those which attain "optimal immiscible displacement" or "optimum immiscible displacement" of a reservoir oil, this phrase shall mean that the material and/or amount thereof is selected to produce a three-phase system, comprising: a predominantly organic phase, a microemulsion phase and a predominantly aqueous phase in which the microemulsion phase is the largest attainable and/or the volumes of oil and water are approximately equal in the microemulsion phase, when a selected surfactant, optionally, a selected cosurfactant, an electrolyte and water are equilibrated with the oil in question. The optimum or optimal immiscible displacement referred to is preferably at the optimal salinity of the system.

Where a base and/or the amount thereof is said to be selected to "significantly alter the pH" of a surfactant system, this terminology is meant to refer to a measurable change in the pH of the system, preferably to attain optimum or optimal immiscible displacement of the reservoir oil as defined above.

A preferred surfactant waterflooding technique is the immiscible surfactant drive technique mentioned in the introductory portion hereof. Such a process, as well as the technique for determining the relative amounts of components of the surfactant solution and other parameters are set forth in detail in U.S. Pat. Nos. 4,255,270 and 4,330,418, which are incorporated herein by reference, in addition to Nos. 4,079,785 and 4,125,156, previously mentioned. Briefly, a slug of a surfactant solution comprising a surfactant, an electrolyte, water, and, optionally, a co-surfactant are injected into the subsurface earth formation to form a multiphase system in situ in the reservoir, which comprises at least two different regions, for example, an oil-rich region and a microemulsion rich region. For best results three different multiphase regions are formed, namely, a microemulsion in equilibrium with an oil phase, a microemulsion in an equilibrium with both an oil and a water phase, and a microemulsion in equilibrium with a water phase. The surfactant will generally be utilized in an amount of between about 1 to 10, and preferably 2 to 5 weight % active ingredient, based on the weight of the water. The water plus inorganic salt comprises about 85% or more of the total mixture. Suitable inorganic salts include sodium sulfate, sodium nitrate, sodium chloride (which is preferable due to its availability and cost), sodium tripolyphosphate, sodium carbonate, etc. but the monovalent metallic salts, particularly sodium chloride are preferred. The inorganic salts are present in the water in an amount within the range of about 250 to 100,000, more preferably 500 to 40,000, and still more preferably 5000 to 25,000 parts per million total dissolved solids. Other electrolytes may also be present in combination with the sodium chloride.

The surfactant, in accordance with the present invention, is an alkali metal soap or salt of a carboxylic acid, preferably having from about ten to about thirty carbon atoms per molecule, and still more preferably having about eighteen carbon atoms per molecule.

Preferred carboxylates are selected from the group consisting of formulas (1), (2), (3) and (4) below:

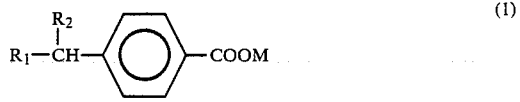

(1)

M is an alkali metal where:
$R_1$ or $R_2$ is hydrogen and the other is an alkyl substituent or $R_1$ and $R_2$ are the same or different alkyl substituents ($R_2$ is preferably an n-pentyl, n-hexyl, n-heptyl, n-octyl, n-nonyl or n-decyl) and $R_2 \leq R_1$; and
$R_1$ and $R_2$ have a total of 6 to 24 carbon atoms.
Examples of such carboxylates are:
p-decyl benzoate
p-dodecyl benzoate
p-tetradecyl benzoate
p-hexadecyl benzoate
4-(1-pentyloctyl)benzoate
4-(1-pentylundecyl)benzoate
4-(1-propyl-4,8-dimethylnonyl)benzoate
4-(1-pentylheptyl)benzoate
4-(1-heptyloctyl)benzoate
4-(1-heptylnonyl)benzoate
4-(1-butyldecyl)benzoate
4-(1-pentylnonyl)benzoate
4-(1-pentyldecyl)benzoate
4-(1-heptylheptyl)benzoate, etc.

(2)

where:
M is an alkali metal;
$R_1$ or $R_2$ is an alkyl substituent or hydrogen;
the other of $R_1$ or $R_2$ is a phenyl, an alkyl phenyl or a phenylalkyl substituent; and
$R_1$ and $R_2$ have a total of 10 to 30 carbon atoms.
Examples of such carboxylates are:
2-benzyltetradecanoate
2-benzyloctadecanoate
9- or 10-phenyloctadecanoates
2-benzyleicosanoate

(3)

where:
M is an alkali metal;
$R_1$ or $R_2$ is an alkyl substituent or hydrogen;
the other of $R_1$ or $R_2$ is a cycloparaffinic or an alkylcycloparaffinic substituent; and $R_1$ and $R_2$ have a total of 10 to 30 carbon atoms.
Examples are:
9- or 10-cyclohexyl-octadecanoates,
naphthenates having saturated 5 and 6 C rings, etc.

$$R_1-\overset{R_2}{\underset{|}{C}}HCOOM \qquad (4)$$

where:

M is an alkali metal;

$R_1$ or $R_2$ is an alkyl substituent or hydrogen and the other is an alkyl, alkenyl or alkadienyl substituent having 1–18 carbon atoms; and $R_1$ and $R_2$ have a total of 6 to 24 carbon atoms.

Representative examples of carboxylates are:
decanoate
dodecanoate
tetradecanoate
octadecanoate
eicosanoate
2-propylhexadecanoate
2-butyltetradecanoate
2,2-dibutyl dodecanoate
2-methylheptadecanoate
9-octadecenoate (oleate)
9,12-octadecadienoate
6-hexadecenoate
isostearate
3,7,11,15-tetramethylhexadecanoate
5,9,13-trimethyltetradecanoate
2-butyldodecanoate
2-butyleicosanoate etc.

The cosurfactant, in an injection solution, may be a polar organic compound, such as an an alcohol having 1–12 carbon atoms per molecule, a primary, secondary, or tertiary amine having 1–12 carbon atoms per molecule, phenol or a phenol having a side chain of 1–10 carbon atoms per molecule, a ketone having 3–12 carbon atoms per molecule, a mercaptan having 2–12 carbon atoms per molecule, a glycol having 2–18 carbon atoms per molecule, a glycerol having 3–18 carbon atoms per molecule, an aldehyde having 2–12 carbon atoms per molecule, an amide having 1–8 carbon atoms per molecule, a nitrile having 2–8 carbon atoms per molecule, and a sulfoxide having 2–12 carbon atoms per molecule. Also, the cosurfactant can be an alcohol, phenol, amine, mercaptan, glycol, or amide of 1–20 carbon atoms per molecule which has been ethoxylated or propoxylated with an average of 1–12 ethylene oxide or propylene oxide units per molecule. The cosurfactant preferably has a solubility in water within the range of about 0.5 to 20, more preferably 2 to 10 grams per 100 grams of water at 20° C. Preferred materials are $C_4$ to $C_7$ alcohols or mixtures thereof. Most preferred are $C_5$ alcohols having a solubility within the range stated above. Isoamyl alcohol and 1-pentanol are particularly suitable. The cosurfactant will generally be used in amounts within the range of about 1 to 10, preferably 1.5 to 4 weight % based on the weight of the water.

In accordance with a further embodiment of the present invention, it has been discovered that, of the above-mentioned carboxylates, those containing branched alkyl groups are preferred and are significantly more effective than unbranched carboxylates.

Further, it has been discovered, in accordance with the present invention, that where the surfactant is an aliphatic carboxylate and the cosurfactant has a solubility in water less than about ten grams per one hundred grams of water at about 20° C. and where the carboxylate contains a phenyl or benzoate group and the cosurfactant is an alcohol having a solubility in water of greater than about ten grams per one hundred grams of water at about 20° C., these combinations are substantially superior to other combinations of surfactant and cosurfactant for the formation of a three-phase microemulsion system having a broad microemulsion phase and/or a microemulsion phase having essentially equal amounts of an organic phase and an aqueous phase therein.

Preferred cosurfactants are alcohols, for example, propyl alcohol, isopropyl alcohol, isobutyl alcohol, secondary butyl alcohol, amyl alcohol, isoamyl alcohol, hexanols, heptanols, octanols, tertiary butyl alcohol, 1-pentanol, 2-pentanol, polyethoxylated alcohols of the general formula;

$$R-(OCH_2CH_2)_xOH$$

where:

R is an alkyl group having 1–20 Carbon atoms; and
x is 1–12;

such as ethoxylated 2-ethylhexanol, ethoxylated alcohols having an average of two to six ethylene oxide units per molecule and Tergitols (a trademark of Union Carbide Corporation) 15-S-5, 25-L-5 and 25-L-3 and TMN-6, the 25-L series being ethoxylated $C_{12}$–$C_{15}$ primary aliphatic alcohols and the 15-S series being ethoxylated $C_{11}$–$C_{15}$ secondary aliphatic alcohols.

As previously indicated, where the carboxylate is an aliphatic, branched or unbranched chain carboxylate, the alcohol should be one having a solubility in water less than about ten grams per hundred grams of water, typically those having a solubility in water less than that of isobutyl alcohol, and where the carboxylate contains a phenyl, benzyl or benzoate group, the alcohol should have a solubility in water of greater than about ten grams per hundred grams of water, typically those having a solubility in water equal to or greater than that of isobutyl alcohol.

The following examples are representative of an extremely large number of tests run in connection with the present invention.

The 2-benzylalkanoic and 2-butylalkanoic acids were prepared by the malonic ester method starting from diethyl benzylmalonate or diethyl butylmalonate and the appropriate alkyl bromide. The procedure used was analogous to that for the preparation of 2-methyldecanoic acid. Preparation of 2,2-dibutyldodecanoic acid was accomplished by alkylation of 2-butyldodecanoic acid using the method of Pfeffer, Silbert, and Chirinko. Hydrogenation of phytol followed by oxidation of the resulting saturated alcohol with a solution of chromium trioxide in acetic acid gave 3,7,11,15-tetramethylhexadecanoic acid.

The alkylbenzoic acids were prepared by reaction of the appropriate alkylbenzene with oxalyl chloride in carbon disulfide using anhydrous aluminum chloride as catalyst by a procedure analogous to that reported by Sokol. Since the crude product obtained by this procedure consisted of the carboxylic acid and its acid chloride, it was necessary to reflux the product with a solution of 4% sodium hydroxide in ethanol-water (9:1). An acidic workup and distillation then gave the pure alkylbenzoic acid.

The following criteria were used to support the identity and purity of each synthesized compound: narrow melting or boiling point range, satisfactory elemental analysis, infrared and nmr spectra, and gas-liquid or thin layer chromatographic analysis. In the case of the alkylbenzoic acids the nmr spectra showed only the existence of the para isomer. However, conversion of 4-(1-pentyloctyl)benzoic acid to its methyl ester, and analysis by gas-liquid chromatography (silicone rubber OV-101) showed the acid to be 98.5% para and 1.5% ortho substituted.

Phenyloctadecanoic acid (K+K Laboratories), which is a mixture of 9 and 10-phenyl isomers, was purified by distillation (bp 211°–212° at 0.06 Torr). This material was hydrogenated at 50 psi using 5% rhodium on carbon in anhydrous methanol (25° C., 24 hr) to give 9 and 10-cyclohexyloctadecanoic acid. All hydrocarbons were greater than 99% pure. All other compounds were reagent grade.

Aqueous solutions of the sodium carboxylates were prepared in the following manner for interfacial tension measurements. To a tared polyethylene bottle containing a magnetic stirring bar were added equimolar amounts of carboxylic acid and sodium hydroxide (added as a dilute solution), the desired amount of sodium chloride, and distilled water so that the total weight of solution was close to the desired amount. After stirring 24 to 48 hours, the pH of the solution was adjusted to the desired value with dilute sodium hydroxide solution, and the total weight of solution was brought to the desired amount with distilled water. The pH of the solution was then rechecked. Unless otherwise noted, all solutions consisted of 0.15% by weight sodium carboxylate and 0.6% sodium chloride. It was necessary to use the polyethylene containers so the solutions would give reproducible interfacial tension values over a period of weeks. When glass containers were used, interfacial tensions could not be reproduced after one week, apparently due to reaction of the alkaline solutions with the glass.

All interfacial tensions were measured using the spinning drop technique which has been described elsewhere. There was no preequilibration of aqueous and hydrocarbon solutions. A small drop of pure hydrocarbon was introduced into the aqueous sodium carboxylate solution, and spinning was continued until successive readings were constant. The time required varied from one to 24 hours. All measurements were made at 30° C. Most of the interfacial tensions reported are the result of more than one determination.

This series of tests did not include the use of a cosurfactant unless indicated.

The results are set forth in Table I below.

TABLE I

| Test No. | Carboxylate | Cosurfactant | Optimal pH | Preferred n-Alkane | Interfacial Tension (dyne/cm) |
|---|---|---|---|---|---|
| 1 | 2-Benzyltetradecanoate | none | 9.4 | heptane | 0.0007 |
| 2 | 2-Benzylhexadecanoate | none | 9.6 | nonane | 0.0009 |
|   |   |   |   | decane | 0.0008 |
| 3 | 2-Benzyloctadecanoate | none | 9.9 | decane | 0.0003 |
| 4 | 2-Benzyleicosanoate | none | 10.5 | undecane | 0.010 |
| 5 | 2-Butyldodecanoate | none | 9.4 | hexane | 0.068 |
| 6 | 2-Butylhexadecanoate | none | 10.3 | nonane | 0.0005 |
| 7 | 2-Butyleicosanoate | none | 11.0 | dodecane | 0.0031 |
| 8 | 2,2-Dibutyldodecanoate | none | 11.0 | dodecane | 0.0070 |
| 9 | 9(and 10)-Phenyloctadecanoate | none | 10.0 | nonane | 0.0072 |
| 10 | 9(and 10)-Cyclohexyloctadecanoate | none | 11.0 | dodecane | 0.0058 |
| 11 | 3,7,11,15-Tetramethylhexadecanoate | none | 10.0 | decane | 0.0072 |
| 12 | 4-(1-propyl-4,8-dimethylnonyl) benzoate | none | 11.0 | nonane | 0.075 |
| 13 | 4-(1-butyldecyl) benzoate | none | 11.0 | nonane | 0.050 |
| 14 | 4-(1-pentyloctyl) benzoate | none | 10.5 | heptane | 0.012 |
| 15 | 4-(1-pentylnonyl) benzoate | none | 11.0 | decane | 0.0005 |
| 16 | 4-(1-pentyldecyl) benzoate | none | 11.5 | undecane | 0.0007 |
| 17 | 4-(1-pentylundecyl) benzoate | none | 11.6 | tetradecane | 0.0002 |
| 18 | 4-(1-heptyloctyl) benzoate | none | 11.5 | undecane | 0.028 |
| 19 | 4-(1-heptylnonyl) benzoate | none | 11.6 | tridecane | 0.190 |
| 20 | 2-Benzyleicosanoate | none | 10.5 | undecane | 0.010 |
| 21 | 2-Benzyleicosanoate | isopentyl alcohol | 10.5 | tetradecane | 0.0026 |
| 22 | 2-Benzyleicosanoate | isobutyl alcohol* | 10.5 | decane | 0.020 |
| 23 | 2-Benzyleicosanoate | acrylonitrile | 10.5 | tridecane | 0.085 |
| 24 | 2-Benzyleicosanoate | dimethylformamide | 10.5 | undecane | 0.0010 |
| 25 | 2-Benzyleicosanoate | nitrobenzene | 10.5 | hexadecane | 0.017 |
| 26 | 2-Benzyleiscosanoate | dimethyl sulfoxide | 10.5 | nonane | 0.021 |
| 27 | 2-Benzyleiscosanoate | triethylene glycol | 10.5 | nonane | 0.028 |
| 28 | 2-Benzyleiscosanoate | sulfolane | 10.5 | tridecane | 0.052 |
| 29 | 2-Benzyleiscosanoate | 1,2-dimethoxyethane | 10.5 | tetradecane | 0.051 |
| 30 | 4-(1-Heptyloctyl) benzoate | none | 11.5 | undecane | 0.028 |
| 31 | 4-(1-Heptyloctyl) benzoate | isopentyl alcohol* | 11.5 | dodecane | 0.206 |
| 32 | 4-(1-Heptyloctyl) benzoate | isobutyl alcohol | 11.5 | tridecane | 0.046 |
| 33 | 4-(1-Heptyloctyl) benzoate | dimethylformamide | 11.5 | undecane | 0.019 |
| 34 | 4-(1-Heptyloctyl) benzoate | isopropyl alcohol | 11.5 | dodecane | 0.024 |
| 35 | 4-(1-Heptyloctyl) benzoate | t-butyl alcohol | 11.5 | tridecane | 0.011 |
| 36 | 4-(1-Heptyloctyl) benzoate | sulfolane | 11.5 | dodecane | 0.0075 |
| 37 | 4-(1-Heptyloctyl) benzoate | dimethyl sulfoxide | 11.5 | dodecane | 0.017 |
| 38 | 4-(1-Heptyloctyl) benzoate | acrylonitrile | 11.5 | dodecane | 0.013 |

*All cosurfactants at 1.0% concentration except for Tests 22 and 31 where cosurfactant concentration was 0.5%.

The results set forth in Table I above illustrate several discoveries in accordance with the present invention, which form preferred embodiments hereof.

Table I shows that ultralow interfacial tensions (less than 0.001 dyne/cm) can be obtained between aqueous carboxylate solutions and hydrocarbons indicating that these carboxylates will be useful surfactants for oil recovery. Each carboxylate was tested with a series of n-alkanes and the preferred n-alkane is the one where the lowest interfacial tension was observed. It is also to be observed that the interfacial tensions between the carboxylates and n-alkanes are highly dependent upon the pH of the mixture. Accordingly, optimal pH's are set forth in Table I. In other words, the optimal pH was that pH at which the minimum interfacial tension was obtained. The optimal pH which gave the lowest interfacial tension depended upon the structure and equivalent weight of the carboxylate to a great extent. The pH Another series of tests were carried out in which aqueous saline solutions containing 3% sodium carboxylate, 3% cosurfactant, and 0.3% $NaHCO_3$-$Na_2CO_3$ were equilibrated with an equal volume of n-decane to form three-phase systems, comprising: an upper predominantly organic phase, a middle microemulsion phase and a lower predominantly aqueous phase. The interfacial tensions were then measured at the respective interfaces of the three-phase system at the optimal salinity. The results of this series of tests are set forth in Table II below.

TABLE II

| | | | | | % Volume Fraction Middle Phase[d] | Interfacial Tension (dyne/cm)[d] | | |
|---|---|---|---|---|---|---|---|---|
| Test[a] No. | Carboxylate | Cosurfactant | pH | Optimal Salinity (% NaCl) | | Top Phase Versus Middle Phase | Middle Phase Versus Bottom Phase | Top Phase Versus Bottom Phase |
| 1 | oleate | isopentyl alcohol | 9.4 | 4.6 | 51 | 0.0013 | 0.0008 | 0.0010 |
| 2 | oleate[b] | isopentyl alcohol | 8.4 | 4.0 | 45 | 0.0006 | 0.0008 | 0.0006 |
| 3 | oleate[b] | 1-pentanol | 8.4 | 3.5 | 53 | 0.0005 | 0.0006 | 0.0002 |
| 4 | oleate | ethoxylated 2-ethylhexanol (2 mol E.O.) | 9.4 | 8.1 | 78 | — | 0.0007 | 0.0025 |
| 5 | isostearate | Tergitol TMN-6[c] | 9.4 | 7.8 | 76 | 0.0005 | 0.0006 | 0.0010 |
| 6 | 2-Benzylhexadecanoate | isopentyl alcohol | 9.7 | 0.28 | 34 | 0.0019 | 0.0027 | 0.0017 |
| 7 | 2-Benzylhexadecanoate | 2-pentanol | 9.7 | 1.26 | 15 | 0.0069 | 0.0190 | 0.0100 |
| 8 | 2-Benzylhexadecanoate | isobutyl alcohol | 9.7 | 1.43 | 12.5 | 0.0168 | 0.0169 | 0.0114 |
| 9 | 2-Benzylhexadecanoate | dimethylformamide | 9.7 | 2.7 | 10 | — | — | — |
| 10 | 2-Benzylhexadecanoate | sulfolane | 9.7 | 3.2 | 12 | — | — | — |

[a]Temperature was 120° F. for tests 1-5 and 30° C. for tests 6-10
[b]Contained 0.6% $NaHCO_3$ (pH 8.4) rather than 0.3% $NaHCO_3$—$Na_2CO_3$
[c]Trademark of Union Carbide Corporation - Trimethylnonanol ethoxylated with an average of six ethylene oxide units.
[d]At the optimal salinity was adjusted to alter the pH of the system a significant amount by the addition of certain bases in determined amounts. Accordingly, in accordance with one aspect of the present invention, surfactant systems for the displacement of oil from a reservoir are prepared by making up a surfactant system containing an alkali metal carboxylate, a cosurfactant, water and an electrolyte, preferably at the optimal salinity for the system, and then altering the pH of the system by adding a selected base in a selected amount to obtain a system having a pH which will result in the optimal immiscible displacement of the reservoir oil.

The data in Table I shows that certain branched carboxylates produce extremely low interfacial tensions useful for oil recovery. These were carboxylates substituted at the 2-position, such as, 2-butyl or 2-benzylalkanoate and alkylbenzoates containing pentyl side chains such as 4-(1-pentylalkyl)benzoate.

The data in Table II shows that carboxylates with alcohols as cosurfactants give excellent phase behavior with n-decane. Three phase systems with large volume fraction middle phase microemulsions are formed. Interfacial tensions between phases at the optimal salinity are usually 0.001 dyne/cm or less. These values are of the magnitude needed for good tertiary oil recovery.

Yet another series of tests was carried out in which surfactant systems were prepared in the manner indicated in the previous examples and were equilibrated with an equal volume of n-decane at 120° F. The aqueous surfactant systems contained 3% carboxylate, 3% alcohol, as a cosurfactant, and the indicated amounts of sodium chloride, which would provide a system with the optimal salinity, while varying the type of base added to alter the pH of the system to give surfactant systems having varying pH's.

TABLE III

| Test No. | Carboxylate | Alcohol | Base | pH | Optimal Salinity % NaCl | % Volume Fraction Middle Phase**** |
|---|---|---|---|---|---|---|
| 1 | isostearate | isopentyl | 0.6% $NaHCO_3$ | 8.5 | 1.6 | 65 |
| 2 | isostearate | isopentyl | 0.6% $NaHCO_3$—$Na_2CO_3$ | 9.4 | 2.3 | 60 |
| 3 | isostearate | isopentyl | 0.6% $NaHCO_3$—$Na_2CO_3$ | 10.5 | 2.5 | 59 |
| 4 | isostearate | isopentyl | 0.6% $Na_2CO_3$ | 11.0 | 3.0 | 56 |
| 5 | isostearate | isopentyl | 0.6% NaOH | 12.6 | 2.9 | 52 |
| 6 | isostearate | isopentyl | 0.6% $Na_4SiO_4$* | 13.0 | 2.7 | 64 |
| 7 | 2-benzyl-octadecanoate | isobutyl | 0.6% $NaHCO_3$—$Na_2CO_3$ | 9.5 | 0.3** | 25 |
| 8 | 2-benzyl-octadecanoate | isobutyl | 0.3% $NaHCO_3$—$Na_2CO_3$ | 10.4 | 0.9** | 20 |
| 9 | isostearate | isopentyl | 0.3% $NaHCO_3$—$Na_2CO_3$ | 9.4 | 2.5 | 56 |
| 10 | oleate | isopentyl | 0.3% $NaHCO_3$—$Na_2CO_3$ | 9.4 | 4.6 | 52 |
| 11 | stearate*** | isopentyl | 0.3% $NaHCO_3$—$Na_2CO_3$ | 9.4 | 4.3 | 24 |

TABLE III-continued

| Test No. | Carboxylate | Alcohol | Base | pH | Optimal Salinity % NaCl | % Volume Fraction Middle Phase**** |
|---|---|---|---|---|---|---|
| 12 | isostearate | isobutyl | 0.3% NaHCO$_3$—Na$_2$CO$_3$ | 9.4 | ~4.5 | 15 |
| 13 | isostearate | isopropyl | 0.3% NaHCO$_3$—Na$_2$CO$_3$ | 9.4 | — | None |

*Sodium orthosilicate
**Temperature was 30° C. rather than 120° F. (49° C.)
***Concentration of carboxylate was 1% rather than the usual 3%
****At the optimal salinity As in Table II, the data in Table III shows that carboxylates when equilibrated with hydrocarbons give three-phase systems with large volume fraction middle phase microemulsions. The large volume fraction middle phases indicate low interfacial tensions between phases which should lead to good oil recovery in core tests. Optimal salinities determined by phase behavior were affected by the type of base added and pH. In accordance with another aspect of the present invention, a selected base in a selected amount is added to the surfactant system to obtain a surfactant system adapted to obtain optimum immiscible displacement of oil. The optimum pH can be determined by a series of tests such as those carried out to obtain the data of Table I or by a series of oil displacement tests from a laboratory core in a manner set forth hereinafter. In any event, one skilled in the art can determine the type of base and the amount necessary to obtain optimal immiscible displacement of a particular oil. It is also to be observed that a poor three-phase system with a small volume fraction middle phase was formed by combinations of isostearate and isobutyl alcohol and no three-phase system was formed with isostearate and isopropyl alcohol. While such systems, as were obtained in these two cases, can be utilized for the immiscible displacement of oil, the much preferred system will form three phases with a large volume fraction middle phase as previously indicated.

A further series of tests were conducted with surfactant systems in accordance with the present invention by the displacement of oil from laboratory cores. The optimal salinities used in the oil displacement tests were based upon the previous and other phase volume studies. In this respect the optimal salinity was defined as the salinity where there was an equal uptake of oil and water in the middle or microemulsion phase. The optimal salinities were determined at 120° F. using n-decane rather than simulated live North Burbank unit crude oil (EACN=10) since long-lasting macroemulsions often occurred using the oil.

Oil displacement tests were carried out in three foot water wet Berea sandstone cores at 120° F. by the following procedure. The dry epoxy-coated core was saturated with brine of the desired salinity in Ark-Burbank water and was then oilflooded with simulated live North Burbank Unit crude oil. The oil saturated core was then waterflooded to irreducible oil saturation with brine of the desired salinity in Ark-Burbank water.

The following preflush, surfactant, and mobility buffer slugs were used in the majority of the oil displacement tests (Procedure A). Any variations in this procedure are noted in the discussion and table. A preflush (10% pore volume, 20 ml/hr, 1.8 feet/day) containing 0.6% base at the desired salinity in distilled water was used. Bases used included sodium bicarbonate, sodium carbonate, sodium hydroxide, and sodium orthosilicate. The surfactant slug (10% pore volume, 10 ml/hr, 0.9 feet/day) consisted of 3.0% sodium carboxylate, 3.0% cosurfactant, and 0.6% base at the desired salinity in distilled water. This was followed by a 50% pore volume mobility buffer slug of 40–45 centipoise Betz Hi Vis (a Trademark of Betz Laboratories, Inc.) polyacrylamide in Ark-Burbank water which was graded back logarithimically with Ark-Burbank water (10 ml/hr, 0.9 feet/day). The composition of the simulated Ark-Burbank water is 0.35 g NaCl, 0.15 g CaCl$_2$, and 0.11 g MgCl$_2$•6H$_2$O per liter of distilled H$_2$O. In a few oil displacement tests higher salinity mobility buffers and mobility buffer diluents (prepared in distilled water) were used.

The following preflush, surfactant, and mobility buffer slugs were used in other oil displacement tests described in the Table (Procedure B). Any variations in this procedure are noted in the discussion and table. A preflush (25% pore volume) containing 0.3% sodium bicarbonate-sodium carbonate at the optimal salinity and pH 9.4 was used. The surfactant slug (20% pore volume) consisted of 3.0% sodium carboxylate, 3.0% cosurfactant, and 0.3% sodium bicarbonate-sodium carbonate at the optimal salinity and pH 9.4. The preflush and surfactant solutions were prepared in distilled water. The surfactant slug was followed by a mobility buffer which is the same as that described above in Procedure A.

Surfactant recoveries were determined by comparison of the amount of carboxylic acid isolated from the core effluents with the amount that was injected. The carboxylic acid was isolated by acidification of the effluents with dilute sulfuric acid to pH 2–3 and then extracting three times with ethyl ether. The combined ether extract was washed with distilled water until neutral, dried with anhydrous sodium sulfate, and evaporated under reduced pressure. The amount of carboxylic acid in the resulting oil sample could be determined from its weight and neutralization equivalent.

Procedure B, as summarized above, was utilized in carrying out runs 1 through 16 of Table IV and Procedure A was utilized in carrying out runs 17 through 26.

TABLE IV

| Test No. | Carboxylate | Alcohol | pH of Surfactant Slug | Optimal Salinity % NaCl | % Tertiary Oil Recovery | % Surfactant Recovered |
|---|---|---|---|---|---|---|
| 1 | isostearate | isopentyl | 9.4 | 2.5 | 85 | 87 |
| 2 | isostearate | isohexyl | 9.4 | 0.95 | 90 | 89 |
| 3 | isostearate | isobutyl | 9.4 | 4.6 | 19 | — |
| 4 | isostearate | none | 9.4 | 1.1 | 21 | 20 |

TABLE IV-continued

| Test No. | Carboxylate | Alcohol | pH of Surfactant Slug | Optimal Salinity % NaCl | % Tertiary Oil Recovery | % Surfactant Recovered |
|---|---|---|---|---|---|---|
| 5 | oleate | isopentyl | 9.4 | 4.65 | 59 | 71 |
| 6 | oleate | 1-hexanol | 9.4 | 1.9 | 76 | 77 |
| 7 | neutralized[a] tall oil | isopentyl | 9.4 | 3.2 | 74 | 81 |
| 8 | stearate[b] | isopentyl | 9.4 | 4.8 | 77 | 99 |
| 9 | naphthenate[c] | isopentyl | 9.1 | 5.3 | 50 | 41 |
| 10 | 2-benzyl-octadecanoate[d] | isobutyl | 9.9 | 1.0 | 65 | 51 |
| 11 | isostearate | Tergitol 15-S-5 | 9.4 | 4.8 | 62 | 41 |
| 12 | isostearate | Tergitol 15-S-5 | 9.4 | 4.8 | 54[f] | 35 |
| 13 | isostearate | Tergitol 25-L-5 | 9.4 | 6.6 | 24[f] | 38 |
| 14 | oleate | Tergitol 25-L-3 | 9.4 | 6.6 | 27[f] | — |
| 15 | oleate | ethoxylated 2-ethylhexanol (2 mol E.O.) | 9.4 | 8.2 | 39 | 49 |
| 16 | isostearate | ethoxylated 2-ethylhexanol (2 mol E.O.) | 9.4 | 4.8 | 38 | 44 |
| 17 | oleate | isopentyl | 8.0 | 4.3 | 69 | — |
| 18 | oleate | isopentyl | 8.0 | 4.3 | 64[f] | 71 |
| 19 | oleate | isopentyl | 8.0 | 4.3 | 43[f] | 21 |
| 20 | stearate[e] | isopentyl | 8.1 | 3.4 | 47 | 65 |
| 21 | isostearate[e] | isopentyl | 8.0 | 3.4 (above) | 70 | 91 |
| 22 | Distilled tall oil (Emery Emtall 731) (58–68% Fatty Acid) | 1-pentanol | 8.6 | 2.15 | 71 | 59 |
| 23 | Tall oil fatty acids (Union Camp Unitol 1090) (91% Fatty Acid) | 1-pentanol | 8.4 | 2.35 | 80 | 64 |
| 24 | Crude tall oil (Boise Cascade, Elizabeth, La.) (Typical 47% Fatty Acid) | 1-pentanol | 8.5 | 2.5 | 59 | 55 |
| 25 | Crude tall oil (Richhold Chemical, Oakdale, La.) | 1-pentanol | 8.4 | 2.5 | 61 | 40 |
| 26 | Crude tall oil (Boise Cascade, Ft. Frances, Ont.) (Typical 27% Fatty Acid) | 1-pentanol | 8.4 | 2.6 | 54 | 32 |

[a]Emery Emtall 729 neutralized with sodium hydroxide.
[b]Followed procedure B except 60% PV surfactant slug containing 1% sodium stearate and 3% isopentyl alcohol was used.
[c]Followed procedure B except preflush slug also contained 3% isopentyl alcohol and pH of preflush and surfactant slugs was 9.1.
[d]The pH of preflush and surfactant slugs was 9.9.
[e]Followed procedure A except 20% PV surfactant slug containing 1% sodium carboxylate, 3% isopentyl alcohol 0.6% sodium bicarbonate, and 3.4% sodium chloride was used.
[f]Mobility buffer and mobility buffer diluent were at the following salinities rather than the usual AB water: Test 12, 4.8% NaCl for mobility buffer and AB water for diluent; Test 13, 5.2% NaCl for both mobility buffer and diluent Test 14, 4.0% NaCl for both; Test 18, 2.5% NaCl for both; Test 19, 4.0% for both.

The results shown in Table IV above generally confirm the previous conclusions. Excellent immiscible displacement was obtained when the oil was displaced by a surfactant system comprising an alkaline metal carboxylate, a cosurfactant and an electrolyte, preferably at the optimum salinity for the system, and a base in an amount sufficient to alter the pH of the system were utilized. Further, the data confirm that, when aliphatic carboxylates are utilized as a surfactant, alcohols having a solubility in water less than about ten grams per one hundred grams of water are most effective and, when the carboxylate contains a phenyl, benzyl, or benzoate group, a cosurfactant alcohol having a solubility in water greater than about ten grams per one hundred grams of water is most effective. Additionally, it is shown that ethoxylated alcohols, particularly $C_8$ to $C_{15}$ alcohols are effective as cosurfactants. The data of Table IV also show that oil recoveries are highly dependent upon the pH of the surfactant system and the type of base added to alter the pH of the system. It is also to be seen from the results of Table IV that aliphatic carboxylates containing branched alkyl groups are superior to those containing linear or straight chain alkyl groups (Tests 1, 6, 20, 21). Branched isostearate is superior to unbranched stearate or oleate. While the data of Table IV indicates lower oil recoveries for carboxylates obtained from tall oils, it should be recognized that even the recoveries indicated are excellent when one considers the ready availability and low cost of these materials compared with generally used sulfonates and the like.

It was also found in accordance with the present invention that the surfactant systems of the present invention are effective in high salt and/or hard brine environments. This was confirmed by a number of tests. By way of example, where a test was carried out in exactly the same manner as test No. 1 of Table IV, except that when an equivalent of calcium ion (½ mol ratio of calcium chloride to carboxylate) and 1% n-decane was added to the surfactant slug, the tertiary oil recovery was still 72%. Thus the utilization of surfactant systems in accordance with the present invention are effective in high salinity and/or hard brine environments.

The percent surfactant recovered, as shown in Table IV is also significant to the extent that a high surfactant recovery is indicative of the fact that small amounts of surfactant will be lost to the formation is an oil recovery process.

Another series of core runs was carried out, in the same manner as previously described, in order to show the critical effect which altering the pH of the surfactant system has on tertiary oil recovery. The results of this series of tests are set forth in Table V, which generally utilized a surfactant system found to be highly effective, namely, a combination of isostearate and isopentyl alcohol.

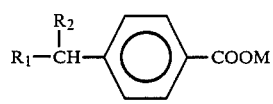

M is an alkali metal where:
$R_1$ and $R_2$ are the same or different alkyl substituents and $R_2 \leq R_1$; and
$R_1$ and $R_2$ have a total of 6 to 24 carbon atoms;

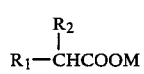

where:
M is an alkali metal;
$R_1$ or $R_2$ is an alkyl substituent;

TABLE V

| Test* No. | Carboxylate | Alcohol | Base Added | pH of Surfactant Slug | Optimal** Salinity % NaCl | % Tertiary Oil Recovery | % Surfactant Recovered |
|---|---|---|---|---|---|---|---|
| 1 | Isostearate | Isopentyl | sodium bicarbonate | 8.5 | 1.6 | 90 | 77 |
| 2 | Isostearate | Isopentyl | sodium bicarbonate | 8.4 | 2.8 (above) | 92 | 76 |
| 3 | Isostearate | Isopentyl | sodium carbonate | 11.0 | 3.1 | 66 | 82 |
| 4 | Isostearate | Isopentyl | sodium carbonate | — | 3.7 (above) | 64 | — |
| 5 | Isostearate | Isopentyl | sodium hydroxide | 12.4 | 3.0 | 60 | 74 |
| 6 | Isostearate | Isopentyl | sodium orthosilicate | 12.8 | 2.8 | 47 | 80 |
| 7 | Isostearate | Isopentyl | no added base | 8.4 | 2.8 | 78 | 58 |
| 8 | p-(1-Pentylnonyl) benzoate | Isobutyl | sodium carbonate | 11.4 | 1.0 (above) | 69 | 17 |
| 9 | p-(1-Pentylnonyl) benzoate | Isobutyl | sodium carbonate | 8.5 | 1.0 (above) | 53 | 31 |

*Tests carried out according to procedure A
**As indicated some core tests were carried out at salinities above the optimal salinity determined by phase behavior The results in Table V show that the oil recovery is highly dependent on the type of base added and the pH of the surfactant system. Aliphatic carboxylates, such as, isostearate, give better recoveries at lower pH, using sodium bicarbonate, than at higher pH, using sodium carbonate, sodium hydroxide, or sodium orthosilicate. Benzoate-type carboxylates such as p-(1-pentylnonyl)-benzoate give better recoveries at higher pH using sodium carbonate than at lower pH using sodium bicarbonate.

While specific materials, equipment and modes of operation have been set forth above, it is to be understood that these specific recitals are by way of illustration and to set forth the best mode in accordance with the present invention only, and are not to be considered limiting and that substitutes, equivalents, variations and modifications thereof will be apparent to one skilled in the art without departing from the present invention.

That which is claimed:

1. A method for immiscibly displacing oil from a subsurface earth formation containing the same comprising:
injecting into said subsurface earth formation a surfactant system comprising an aqueous mixture of an alkali metal carboxylate selected from the group consisting of carboxylates represented by formulas 1, 2, 3 and 4 below:

the other of $R_1$ or $R_2$ is a phenyl, an alkylphenyl or a phenylalkyl substituent; and
$R_1$ and $R_2$ have a total of 10 to 30 carbon atoms;

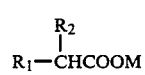

where:
M is an alkali metal;
$R_1$ or $R_2$ is an alkyl substituent;
the other of $R_1$ or $R_2$ is a cycloparaffinic or an alkylcycloparaffinic substituent; and
$R_1$ and $R_2$ have a total of 10 to 30 carbon atoms;

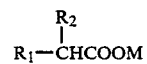

where:
M is an alkali metal;
$R_2$ is an alkyl substituent;
$R_1$ is an alkyl, alkenyl or alkadienyl substituent having 1-18 carbon atoms; and
$R_1$ and $R_2$ have a total of 6 to 24 carbon atoms;
an organic polar cosurfactant having a solubility in water of less than about 10 g per 100 g of water at 20° C. when a carboxylate of formula (4) is utilized or a solubility in water of 10 g per 100 g of water at 20° C. or greater when a carboxylate of formulas 1, 2 or 3 is utilized, an electrolyte in concentrations and proportions sufficient to form an immiscible, three-phase mixture with said oil comprising a predominately oil phase, a microemulsion phase and a predominately aqueous phase and a base in an amount sufficient to significantly alter the pH of said surfactant system and obtain optimal immiscible displacement of said oil.

2. A method in accordance with claim 1 wherein the carboxylate is a carboxylate of formula (1) and the cosurfactant has solubility of 10 g per 100 g of water or greater at 20° C.

3. A method in accordance with claim 2 wherein $R_2$ is a butyl or pentyl substituent.

4. A method in accordance with claim 1 wherein the carboxylate is a carboxylate of formula (2) and the cosurfactant has a solubility of 10 g per 100 g of water or greater at 20° C.

5. A method in accordance with claim 4 wherein $R_2$ is an alkyl substituent.

6. A method in accordance with claim 5 wherein $R_2$ is a butyl or pentyl substituent.

7. A method in accordance with claim 4 wherein $R_2$ is a phenyl, alkylphenyl or phenylalkyl substituent.

8. A method in accordance with claim 7 wherein $R_2$ is a phenyl substituent.

9. A method in accordance with claim 1 wherein the carboxylate is a carboxylate of formula (3) and the cosurfactant has a solubility of 10 g per 100 g of water or greater at 20° C.

10. A method in accordance with claim 9 wherein $R_2$ is an alkyl substituent.

11. A method in accordance with claim 10 wherein $R_2$ is a butyl or pentyl substituent.

12. A method in accordance with claim 9 wherein $R_2$ is a cycloparaffinic or an alkyl cycloparaffinic substituent.

13. A method in accordance with claim 1 wherein the carboxylate is a carboxylate of formula 4 and the cosurfactant has a solubility of less than 10 g per 100 g of water at 20° C.

14. A method in accordance with claim 13 wherein $R_2$ is an alkyl substituent.

15. A method in accordance with claim 14 wherein $R_2$ is a butyl or a pentyl substituent.

16. A method in accordance with claim 1 wherein the cosurfactant is an alcohol.

17. A method in accordance with claim 16 wherein the alcohol has from 1 to 12 carbon atoms per molecule.

18. A method in accordance with claim 17 wherein the alcohol has from 4 to 7 carbon atoms per molecule.

19. A method in accordance with claim 16 wherein the alcohol is a polyethoxylated alcohol having the following formula:

$$R-(OCH_2CH_2)_xOH$$

where R is an alkyl substituent having 1 to 20 carbon atoms and X is 1 to 12.

20. A method in accordance with claim 1 wherein the carboxylate is a carboxylate of formula (1), (2) or (3) and the pH is at least about 9.4.

21. A method in accordance with claim 1 wherein the carboxylate is a carboxylate of formula (4) and the pH is less than about 9.4.

* * * * *